United States Patent
Shah et al.

(10) Patent No.: US 10,171,877 B1
(45) Date of Patent: Jan. 1, 2019

(54) SYSTEM AND METHOD FOR DYNAMICALLY SELECTING SUPPLEMENTAL CONTENT BASED ON VIEWER EMOTIONS

(71) Applicant: Dish Network L.L.C., Englewood, CO (US)

(72) Inventors: Rima Shah, Thornton, CO (US); Ryan Blake, Denver, CO (US); Christopher Day, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/798,061

(22) Filed: Oct. 30, 2017

(51) Int. Cl.
| H04N 21/466 | (2011.01) |
| H04N 21/442 | (2011.01) |
| H04N 21/4223 | (2011.01) |
| H04N 21/81 | (2011.01) |
| H04N 21/45 | (2011.01) |

(52) U.S. Cl.
CPC ..... *H04N 21/4668* (2013.01); *H04N 21/4223* (2013.01); *H04N 21/44218* (2013.01); *H04N 21/4532* (2013.01); *H04N 21/812* (2013.01)

(58) Field of Classification Search
CPC .......... H04N 21/4668; H04N 21/4532; H04N 21/812; H04N 21/44218; H04N 21/4223
USPC .......................................................... 725/12
See application file for complete search history.

(56) References Cited

U.S. PATENT DOCUMENTS

| 5,792,971 A | 8/1998 | Timis et al. |
| 6,622,174 B1* | 9/2003 | Ukita ................ G06Q 30/02 705/14.64 |
| 6,921,336 B1* | 7/2005 | Best .................. A63F 13/10 463/32 |
| 7,653,543 B1 | 1/2010 | Blair et al. |

(Continued)

FOREIGN PATENT DOCUMENTS

WO    2015/069267 A1    5/2015

OTHER PUBLICATIONS

Aschmann, Rick. "North American English Dialects, Based on Pronunciation Patterns," retrieved from http://www.aschmann.net/AmEng/, on Apr. 24, 2017, 57 pages.

(Continued)

*Primary Examiner* — Michael B Pierorazio
(74) *Attorney, Agent, or Firm* — Seed IP Law Group LLP

(57) ABSTRACT

Embodiments are directed towards providing supplemental content to a viewer based on the viewer's emotion and environment while the viewer is viewing content. Content is provided to a content receiver for presentation to the viewer. While the viewer is viewing the content, an image of the viewer is captured and analyzed to detect the viewer's emotion and environment. Supplemental content is selected based on this detected viewer emotion and environment and presented to the viewer, which allows the supplemental content to be tailored to the emotional state of the viewer. One or more additional images of the viewer are captured while the viewer is viewing the supplemental content and the viewer's emotion while viewing the supplemental content is detected. This subsequent viewer emotion is analyzed to determine if the viewer had an expected response to the supplemental content, which can be used to determine the efficiency of the supplemental content.

20 Claims, 6 Drawing Sheets

(56) References Cited

U.S. PATENT DOCUMENTS

| | | | |
|---|---|---|---|
| 7,712,125 B2* | 5/2010 | Herigstad | H04N 7/163 725/141 |
| 7,769,183 B2 | 8/2010 | Bharitkar et al. | |
| 8,019,476 B2* | 9/2011 | Kondo | E05B 47/0009 340/3.7 |
| 8,065,701 B2* | 11/2011 | Hattori | G06Q 30/0241 705/14.4 |
| 8,135,963 B2* | 3/2012 | Sato | G06F 21/14 380/206 |
| 8,249,950 B2* | 8/2012 | Pasupulati | G06Q 20/02 705/26.1 |
| 8,280,009 B2* | 10/2012 | Stepanian | G06F 21/10 379/1.01 |
| 8,296,803 B2* | 10/2012 | Yamaoka | H04N 5/44543 725/143 |
| 8,364,477 B2 | 1/2013 | Song et al. | |
| 8,438,590 B2* | 5/2013 | Crenshaw | H04H 60/33 725/10 |
| 8,462,645 B1* | 6/2013 | Harb | G06Q 30/0241 370/252 |
| 8,531,050 B2* | 9/2013 | Barney | A63H 30/04 290/1 R |
| 8,640,021 B2 | 1/2014 | Perez et al. | |
| 8,670,030 B2* | 3/2014 | Tanaka | G01S 19/49 348/136 |
| 8,677,391 B2* | 3/2014 | Tanaka | G06Q 30/02 725/23 |
| 8,698,746 B1* | 4/2014 | Merrick | G06F 3/038 178/19.05 |
| 8,740,708 B2* | 6/2014 | Karacal | A63F 13/98 463/38 |
| 8,830,170 B2* | 9/2014 | Kao | G06F 3/0325 345/156 |
| 8,854,447 B2 | 10/2014 | Conness et al. | |
| 8,886,260 B2* | 11/2014 | Ryu | H04L 51/38 348/14.02 |
| 8,903,176 B2 | 12/2014 | Hill | |
| 9,047,054 B1 | 6/2015 | Goldstein et al. | |
| 9,099,972 B2 | 8/2015 | Gao et al. | |
| 9,264,834 B2 | 2/2016 | Soulodre | |
| 9,357,308 B2 | 5/2016 | Freeman | |
| 9,398,247 B2 | 7/2016 | Tateishi | |
| 9,398,392 B2 | 7/2016 | Ridihalgh et al. | |
| 9,426,538 B2 | 8/2016 | Byers | |
| 9,514,481 B2 | 12/2016 | Kumar et al. | |
| 9,516,259 B2* | 12/2016 | Zheng | H04N 5/76 |
| 9,525,919 B2* | 12/2016 | Knudson | H04N 21/235 |
| 2002/0162120 A1* | 10/2002 | Mitchell | H04N 7/165 725/135 |
| 2003/0032890 A1 | 2/2003 | Hazlett et al. | |
| 2003/0093784 A1 | 5/2003 | Dimitrova et al. | |
| 2003/0216177 A1* | 11/2003 | Aonuma | A63F 13/10 463/32 |
| 2004/0013252 A1 | 1/2004 | Craner | |
| 2005/0079474 A1 | 4/2005 | Lowe | |
| 2005/0210502 A1* | 9/2005 | Flickinger | G06Q 30/02 725/34 |
| 2005/0288954 A1 | 12/2005 | McCarthy et al. | |
| 2005/0289582 A1 | 12/2005 | Tavares et al. | |
| 2006/0041472 A1* | 2/2006 | Lukose | G06Q 30/00 705/14.66 |
| 2007/0022437 A1* | 1/2007 | Gerken | H04N 7/17318 725/41 |
| 2007/0052177 A1* | 3/2007 | Ikeda | A63F 13/24 273/317 |
| 2007/0060391 A1* | 3/2007 | Ikeda | A63F 13/06 463/46 |
| 2007/0124775 A1* | 5/2007 | DaCosta | H04N 7/17318 725/62 |
| 2007/0265507 A1 | 11/2007 | de Lemos | |
| 2007/0271580 A1* | 11/2007 | Tischer | H04H 60/07 725/35 |
| 2008/0082510 A1* | 4/2008 | Wang | H04H 60/37 |
| 2008/0178241 A1* | 7/2008 | Gilboy | H04N 7/17318 725/114 |
| 2009/0067847 A1* | 3/2009 | Nakamura | G08C 23/04 398/128 |
| 2009/0093784 A1 | 4/2009 | Hansen et al. | |
| 2009/0133051 A1 | 5/2009 | Hildreth | |
| 2009/0163274 A1* | 6/2009 | Kando | A63F 13/10 463/31 |
| 2009/0195392 A1* | 8/2009 | Zalewski | G06F 3/012 340/573.1 |
| 2009/0249388 A1* | 10/2009 | Seidel | H04N 21/4126 725/32 |
| 2010/0060722 A1 | 3/2010 | Bell | |
| 2010/0107075 A1 | 4/2010 | Hawthorne et al. | |
| 2010/0192173 A1* | 7/2010 | Mizuki | A63F 13/12 725/25 |
| 2010/0199318 A1* | 8/2010 | Chang | H04N 7/17318 725/97 |
| 2011/0190052 A1* | 8/2011 | Takeda | A63F 13/02 463/31 |
| 2011/0247042 A1* | 10/2011 | Mallinson | G06F 17/30026 725/86 |
| 2012/0046767 A1* | 2/2012 | Shimohata | A63F 13/217 700/91 |
| 2012/0083942 A1 | 4/2012 | Gunaratne | |
| 2012/0123769 A1 | 5/2012 | Urata | |
| 2012/0133582 A1* | 5/2012 | Ohsawa | G06F 3/0308 345/157 |
| 2012/0143693 A1 | 6/2012 | Chung et al. | |
| 2012/0192222 A1* | 7/2012 | Kumar | G06Q 30/0251 725/32 |
| 2012/0192228 A1* | 7/2012 | Zito | G06F 17/30035 725/34 |
| 2012/0309515 A1* | 12/2012 | Chung | H04N 21/274 463/31 |
| 2013/0080260 A1 | 3/2013 | French et al. | |
| 2013/0171897 A1* | 7/2013 | Hsu Tang | B32B 5/20 442/76 |
| 2013/0194406 A1 | 8/2013 | Liu et al. | |
| 2013/0238413 A1* | 9/2013 | Carlson | G06Q 30/0224 705/14.25 |
| 2013/0311270 A1 | 11/2013 | Daftary et al. | |
| 2013/0335226 A1* | 12/2013 | Shen | H04R 5/033 340/573.1 |
| 2014/0052513 A1* | 2/2014 | Ryan | G06Q 30/0255 705/14.16 |
| 2014/0108135 A1 | 4/2014 | Osborn | |
| 2014/0130076 A1 | 5/2014 | Moore et al. | |
| 2014/0168071 A1* | 6/2014 | Ahmed | H04N 5/23206 345/156 |
| 2014/0280296 A1 | 9/2014 | Johnston et al. | |
| 2014/0309511 A1* | 10/2014 | Stal | G16H 50/50 600/365 |
| 2015/0010169 A1 | 1/2015 | Popova | |
| 2015/0078595 A1 | 3/2015 | Shintani et al. | |
| 2015/0121418 A1* | 4/2015 | Jain | H04N 21/812 725/32 |
| 2016/0227280 A1 | 8/2016 | Candelore | |
| 2016/0316059 A1 | 10/2016 | Nuta et al. | |
| 2016/0350801 A1 | 12/2016 | Vincent et al. | |
| 2017/0018008 A1 | 1/2017 | Hajiyev et al. | |
| 2017/0046601 A1 | 2/2017 | Chang et al. | |
| 2017/0053320 A1 | 2/2017 | Russek | |

OTHER PUBLICATIONS

Labov, William, Sharon Ash, and Charles Boberg. "11: The Dialects of North American English." The Atlas of North American English: Phonetics, Phonology, and Sound Change: A Multimedia Reference Tool. Berlin: Mouton De Gruyter, 2006. 35 pages.

Wikipedia, "Auto-Tune," retrieved from http://en.wikipedia.org/wiki/auto-tune, on Mar. 16, 2017, 4 pages.

* cited by examiner

SYSTEM AND METHOD FOR DYNAMICALLY SELECTING SUPPLEMENTAL CONTENT BASED ON VIEWER EMOTIONS

BACKGROUND

Technical Field

The present disclosure relates generally to presenting content to a viewer, and more particularly to analyzing emotions of the viewer to select supplemental content that induces an expected emotional reaction from the viewer.

Description of the Related Art

Over the past several years, set-top boxes have greatly improved the television viewing experience for viewers. This improvement has been aided by the number of content channels that are available to listen or watch at any given time, the quality of video and audio output devices, and the quality of the input signal carrying the content. By improving the television viewing experience, viewers tend to increase the amount of time consuming content, which also increases the number of advertisements presented to the viewer.

However, when it comes to determining the success of an advertisement, advertisers are typically limited to cumbersome surveys or coupon redemptions to determine how effective the advertisement was to particular viewer. Such surveys and coupon redemption programs are typically unreliable because viewers may not participate in the survey, forget or not use the coupon code, forget about the advertisement, etc., especially if there is a time delay between the viewer seeing an advertisement and the viewer acting on the advertisement or completing a survey. It is with respect to these and other considerations that the embodiments herein have been made.

BRIEF SUMMARY

Embodiments described herein are directed towards detecting a viewer's emotion and the viewer's environment while the viewer is viewing content and selecting supplemental content based on the detected emotion and environment. In various embodiments, content is provided to a content receiver for presentation to the viewer. While the viewer is viewing the content, at least one image of the viewer is captured and analyzed to detect the viewer's emotion. The supplemental content is then selected based on this detected viewer emotion. In various embodiments, the supplemental content is also selected based on the viewer's environment alone or in combination with the viewer's emotion. The supplemental content is then presented to the viewer. In this way, supplemental content can be tailored to the emotional state of the viewer, which can cause an emotional reaction in the viewer to act on the supplemental content. In some embodiments, one or more additional images of the viewer are captured while the viewer is viewing the supplemental content and the viewer's emotion while viewing the supplemental content is detected. This subsequent viewer emotion is analyzed to determine if the viewer had the expected response to the supplemental content, which can be used to determine the efficiency of the supplemental content. A feedback loop can be created to improve the supplemental content to more reliably obtain the expected response from the user.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
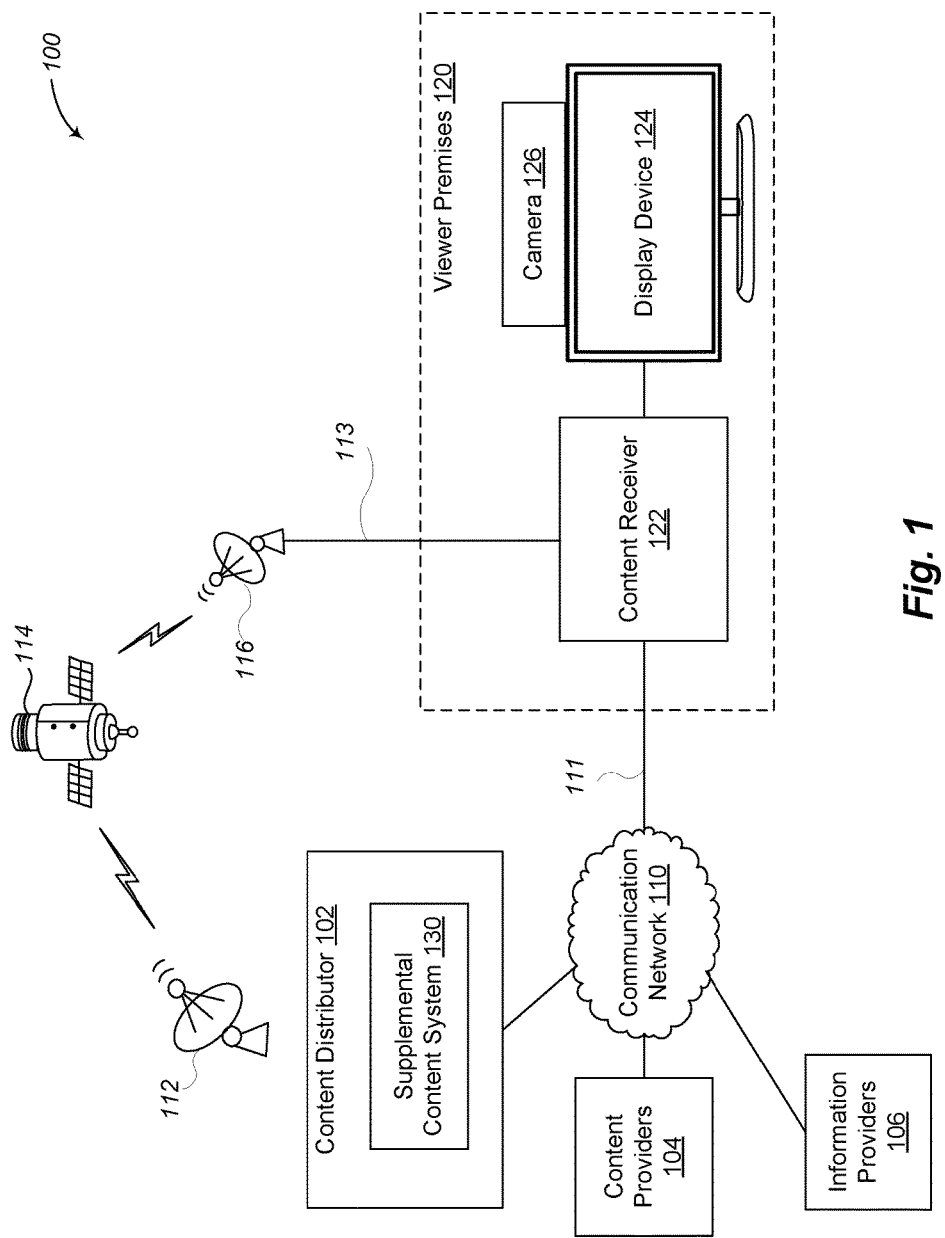
FIG. 1 illustrates a context diagram of an environment for providing content to a viewer in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or"

operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "viewer" refer to a person or persons watching or viewing content on a display device. Although embodiments described herein utilize viewer in describing the details of the various embodiments, embodiments are not so limited. For example, the term "viewer" may be replaced with the term "user" throughout the embodiments described herein, in some implementations. A "user" refers more generally to a person or persons consuming content. Accordingly, a user may be listening to audio content, watching visual content, or consuming audiovisual content.

References herein to the term "content" refer to audio, visual, or audiovisual content that is presented to a viewer. Examples of content include text, graphics, video, or other information presented to the viewer, which may include, but is not limited to, television or radio programs, sports broadcasts, news feeds, advertisements, and other types of displayable or audible content. Similarly, "supplemental content" refers to audio, visual, or audiovisual content that is presented to a viewer after, during, or in the middle of presenting other content to the viewer. For example, in some embodiments, the content may be a television program, and the supplemental content may be an advertisement that is presented to the viewer during a commercial break in the television program. In another embodiment, the content may be a first advertisement presented to the viewer during a commercial break of a television program, and the supplemental content may be a second advertisement that is presented to the viewer following the presentation of the first advertisement. Accordingly, supplemental content includes text, graphics, video, or other information presented to the viewer, which may include, but is not limited to, television or radio programs, sports broadcasts, news feeds, advertisements, and other types of displayable or audible content, which is presented to the viewer after, during, or in the middle of presenting other content to the viewer.

FIG. 1 shows a context diagram of one embodiment of an environment 100 for providing content to a viewer in accordance with embodiments described herein. Environment 100 includes content providers 104, information providers 106, content distributor 102, communication network 110, and viewer premises 120.

Viewer premises 120 includes a content receiver 122, a display device 124, and a camera 126. The content receiver 122 is a computing device that receives content and supplemental content for presentation on the display device 124 to a viewer on the viewer premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

Although FIG. 1 illustrates the content receiver 122 as providing content for display on a display device 124 located on the viewer premises 120, embodiments are not so limited. In some embodiments, the content receiver 122 provides the content to a viewer's mobile device (not illustrated), such as a smartphone, tablet, or other computing device, that is at a remote location to the user premises 120. In yet other embodiments, the content receiver 122, the display device 124, and the camera 126, may be integrated into a single computing device, such as the viewer's smartphone, tablet, or laptop.

In various embodiments, the content distributor 102 provides content and supplemental content to the content receiver 122. The content distributor 102 may receive a plurality of different content and supplemental content from one or more content providers 104, one or more information providers 106, or a combination thereof. In various embodiments, the content distributor 102 selects which supplemental content to provide with other content being provided to the content receiver 122. For example, the content distributor 102 receives a television program from one content provider 104 and an advertisement from a different content provider 104. While the content distributor 102 is providing the television program to the content receiver 122 it selects when to insert the advertisement into the television program, at which point the content distributor 102 provides the advertisement to the television receiver 122.

In various embodiments, the content distributor 102 includes a supplemental content system 130 to select which supplemental content to present to the viewer along with the content being presented to the viewer. The supplemental content system 130 receives one or more images of the viewer from the camera 126 via the content receiver 122. The supplemental content system 130 analyzes the images to detect an emotion of the viewer while the viewer is viewing content and selects supplemental content to provide to the viewer based on the detected viewer emotion, as described in more detail herein. In some embodiments, the viewer emotion is determined by facial expressions of the viewer; body posture, position, or movement; or contextual information or changes in the environment surrounding the viewer.

The following briefly discusses additional components in example environment 100. The content distributor 102 provides content and supplemental content, whether obtained from content provider 104 and/or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Figure 2:
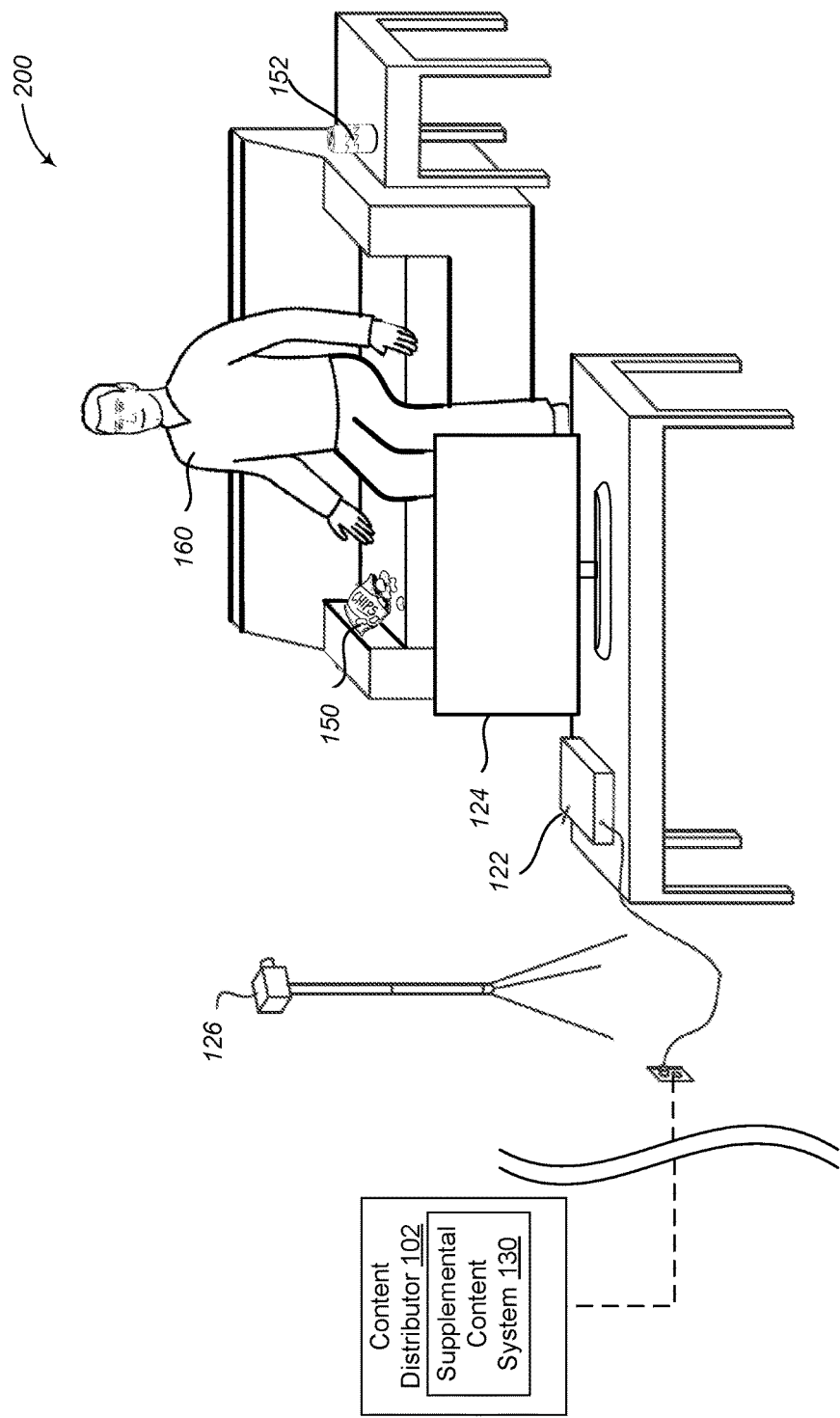
FIG. 2 is a context diagram of one non-limiting embodiment of a viewer's premises for presenting content to the viewer in accordance with embodiments described herein.

FIG. 2 is a context diagram of one non-limiting embodiment of an environment of a viewer's premises for presenting content to the viewer in accordance with embodiments described herein. Example environment 200 includes content receiver 122, display device 124, viewer 160, and camera 126. Also illustrated is the content distributor 102, which is remote from the user premises, as depicted in FIG. 1.

The camera 126 is configured and positioned to take one or more images of viewer 160 while the viewer 160 is viewing content being presented on the display device 124. The camera 126 provides the images to the content receiver 122 for sending to the content distributor 102. The images can also be sent only to the supplement content system 130 and not the content distributor, which may provide a faster response and shorter feedback loop for the supplement content and its evaluation. In various embodiments, the camera 126 may be a standalone camera, as illustrated, or it may built-in or integrated with another computing system, such as in content receiver 122, display device 124, or other computing device (e.g., the viewer's smartphone, tablet, laptop computer, or other computing device that has an integrated camera). The viewer or viewers may each have a smart phone that includes a camera. Each viewer can use their smart phone camera to capture an image of themselves or others in the room. These images can then be provided to the content receiver 122. Thus, in one embodiment, the content receiver 122 is obtaining multiple images, in some instances five or more images, each from a different angle that will permit a more accurate input to analyze viewers for emotions and changes in emotions. The content receiver 122 sends the captured images to the content distributor 102 and/or the supplemental content system 130 for analysis.

In some embodiments, the supplemental content system 130 receives, from the content receiver 122, the one or more images of the viewer 160, the viewer's environment 200, or a combination thereof. The supplemental content system 130 analyzes the images to detect the viewer's emotion in response to the content being presented to the viewer 160. In some embodiments, the images of the viewer 160 are analyzed for facial or bodily features to identify a particular emotion. In at least one embodiment, various different facial or bodily characteristics of the viewer 160 are identified using various image recognition techniques, such as by comparing the images or portions thereof with stored images of known emotions. Notably, the supplemental content system 130 does not require the viewer to be identified and associated with a profile of viewer information. Instead, information that includes numerous examples of various facial expressions that are associated with corresponding emotions is stored by the supplemental content system 130. Those various facial expressions that are associated with corresponding emotions may be compared against the facial expressions observed in the images of the viewer 160. In some embodiments, the supplemental content system 130 may apply known facial expression/emotion rules that assist in correlating stored facial expression/emotion information with observed feature/emotion information in the images of the viewer 160.

Based on this detected viewer emotion, the supplemental content system 130 selects one or more supplemental content to present to the viewer 160 via the display device 124 to provoke an expected emotional response from the viewer 160.

For example, the viewer 160 may be watching a particular television program that is making them sad. The supplemental content system 130 analyzes an image of the viewer 160 taken by the camera 126 for characteristics that are common when a person is sad (e.g., pouting lips, droopy eyes, slouched posture, etc.). From this information the supplemental content system 130 may select an advertisement that is intended to make the viewer happy, which may be identified as an expected emotional response to the advertisement. It is this expected emotional response—feeling happiness from the advertisement after feeling sad while viewing a show—that may provoke the viewer into acting on the advertisement, such as purchasing the advertised product, which indicates that the advertisement was effective towards that viewer.

In various embodiments, the supplemental content system 130 also stores a database (not illustrated) of relationships between viewer emotions and supplemental-content categories and the expected emotional response. A supplemental-content category is a type of descriptor for particular content or content subject matter. Examples of such categories may be a genre, a projected audience, an actor/actress/director/composer/artist/musician featured in the content, an emotion of the characters/actors/actresses in a particular scene, filming or scene location, or other types of descriptors.

The supplemental content system 130 and its database can be provided and controlled by the content distributor 102, as illustrated, or they may be provided and controlled by a different entity. For example, in one embodiment, the content distributor 102 provides both the content and supplement content. In other embodiments, the content in each comes from a different source. For example, the content distributor 102 might be a database that stores and outputs movies and the supplement content system 130 might provide advertisements that occur in between breaks in the movies. On the other hand, the content distributor 102 might receive part of its content from a particular content creator, such as HBO, TNT, Showtime, ESPN, College Football, or some other content creator and then distributes that content as original content, where the supplement content system 130 is provided and controlled by a different entity or entities.

The supplement content system 130 may have a database that is provided and sourced by one or more advertisers that provide supplemental content that is outside the control of the content distributor 102. For example, the supplement content system 130 might provide advertisements for truck tires that occur in between breaks in a sporting event, or supplement content system 130 might provide advertisements for clothes, make-up, or other personal items during the showing of a reality TV show, such as Dancing with the Stars, The Voice, America's Got Talent. During other reality TV shows related to driving or trucks, such as the Fireball Run, Alaska's Off-road Warriors, Bullrun, Cannonball Road Race, or the like, the supplemental content system 130 may provide advertisements for tires, trucks, or other items to be of expected interest to the viewers. Accordingly, in some embodiments, the supplemental content may be selected, evaluated, and controlled by the producers of each respective TV show or their sponsors.

The plan of the supplemental content sponsors is to generate a strong buying or acting response from the viewers of the supplemental content, which they may identify or link to an expected emotion or expected change in emotion for a particular type of supplemental content, whether it is interest, excitement, curiosity, happiness, etc. It is to be expected that the emotion, which creates a buying or acting response in a certain viewing group for one type of goods, such as toys, clothes, or make-up, would be different for a different viewing group to buy different goods, such as truck tires or beer.

In one embodiment, supplement content system 130 is controlled in all respects by the advertiser who has purchased that block of time. This control includes one or more of the steps of selecting the supplemental content to produce the expected result, analyzing the data to determine if the expected result occurred, making changes to the supplemental content to more reliable obtain the expected result, as well as controlling the feedback loop for detection and change of content in the supplement content system 130. The expected emotional response stored with each relationship may indicate the expected viewer emotion during or after viewing the supplemental content. The expected emotional response may be identified when a majority of a plurality of viewers shares a same emotion in response to the supplemental content and acted after viewing the supplemental content, or it may be determined by an administrator. Table 1 below illustrates one example of a plurality of emotion/supplemental-content relationships and their expected emotional response.

TABLE 1

| Emotion prior to supplemental content | Supplemental-content Category | Expected Emotional Response |
| --- | --- | --- |
| Happy | Soda Pop advertisement | Happy |
| Sad | Happy advertisement | Happy |
| Sad | Alcohol advertisement | Contempt |
| Fear | Toy advertisement | Curiosity |
| Surprise | Car advertisement | Interest |
| Neutral | Sad advertisement | Anger |
| Happy | Jewelry advertisement | Surprise |

A sad advertisement might be one showing animals that have been abandoned who need a sponsor or a new home. A happy advertisement might be one that shows a birthday party. Accordingly, the supplemental content may include subject matter of a particular mood, theme, genre, emotional state, etc., and can be for goods, services, donations, or any other type of presentation of information. The database of emotion/supplemental-content relationships is utilized by the supplemental content system 130 to select which supplemental content to provide to the viewer 160. For example, if the viewer 160 is currently happy, then the supplemental content system 130 may select a jewelry advertisement to present to the viewer 160 via the display device 124.

In some embodiments, the supplemental content supplier or provider may define a desired expected emotional response when selecting supplemental content. For example, if the viewer 160 is currently sad and the supplemental content supplier desires an emotional response of contempt, then the supplemental content system 130 may select a beer commercial, since the expected emotional response to an alcohol advertisement is contempt when the viewer 160 was sad, rather than selecting a happy advertisement that typically invokes a happy response.

By using these types of emotion/supplemental-content relationships, advertisers and other supplemental-content providers can define or provide guidance to the supplemental content system 130 as to which supplemental content may be effective given the current emotional state of the viewer 160 and the desired or expected emotional response.

In yet other embodiments, the supplemental content system 130 may also store a database (not illustrated) of relationships between content categories, supplemental-content categories, viewer emotions, and their corresponding expected emotional response. Similar to what is described above, a content or supplemental-content category is a type of descriptor for particular content or content subject matter. Again, examples of such categories may be a genre, a projected audience, an actor/actress/director/composer/artist/musician featured in the content, an emotion of the characters/actors/actresses in a particular scene, filming or scene location, or other types of descriptors. Table 2 below illustrates one example of a plurality of content/supplemental-content relationships and their corresponding emotion information.

TABLE 2

| Content Category | Emotion prior to supplemental content | Supplemental-content Category | Expected Emotional Response |
| --- | --- | --- | --- |
| Western Movie | Happy | Soda Pop advertisement | Happy |
| Sad scene | Sad | Happy advertisement | Happy |
| Sad scene | Boredom | Car advertisement | Neutral |
| Sad scene | Sad | Alcohol advertisement | Anger |
| Scary program | Fear | Toy advertisement | Happy |
| Romantic program | Surprise | Car advertisement | Interest |
| Neutral | Neutral | Sad advertisement | Anger |
| Romantic program | Happy | Jewelry advertisement | Surprise |

Similar to what is described above in conjunction with Table 1, the database of emotion/content/supplemental-content relationships is utilized by the supplemental content system 130 to select which supplemental content to provide to the viewer 160 based on the viewer's current emotion and the current content category. For example, if the subject matter of the current content is a sad scene and the viewer 160 is currently neutral, then the supplemental content system 130 may select a car advertisement to present to the viewer. However, if the viewer 160 was sad during the sad scene, the supplemental content system 130 may select a flower advertisement that is labeled as a happy advertisement. In various embodiments, the supplemental content supplier may also provide or define a desired expected emotional response, as discussed above. By using these types of emotion/content/supplemental-content relationships, advertisers and other supplemental-content providers can define or provide guidance to the supplemental content system 130 as to which supplemental content may be effective given the current emotional state of the viewer 160 while viewing a particular type of content.

In some embodiments, the supplemental content system 130 may provide additional information regarding the efficacy of the supplemental content by analyzing additional images taken while the viewer 160 is viewing the supplemental content. Namely, after the supplement content is provided, the viewer emotions are analyzed to determine whether the expected emotion was achieved as part of a feedback loop. If it was achieved, then this can guide future content selection for the same type of content in the feedback loop; if it was not achieved, then this might guide for the selection of different content for future presentation in the feedback loop. In this way, the supplemental content system 130 can view the viewer's emotions before viewing the supplemental content and during or after viewing the supplemental content to determine if the viewer experienced the expected emotional response. Such additional information may also be utilized to update the stored database relationships, such as if viewer emotions in response to supplemental content change over time.

In various other embodiments, the supplemental content system 130 analyzes images of the viewer's environment 200 to select supplemental content or to determine the emotion or response of the viewer 160 to the supplemental content. For example, the camera 126 takes one or more images of the viewer's environment 200 as the viewer is watching content on the display device 124, which are provided to the supplemental content system 130. The supplemental system 130 analyzes the images of the environment 200 to detect one or more contextual information regarding the environment. For example, environment 200 may include potato chips 150. In response to detecting the potato chips 150 in the viewer's environment 200, the supplemental content system 130 selects an advertisement for soda pop to present to the viewer 160 via the display device 124. In various embodiments, the supplemental content system 130 may store a database indicating which supplemental content to present to the viewer 160 when particular contextual information is identified in the viewer's environment.

The viewer's environment 200 can also be utilized to determine the effectiveness of the supplemental content. In various embodiments, the camera 126 may take one or more additional images of the viewer's environment 200 during or after the presentation of the supplemental content to the viewer 160. These images are analyzed by the supplemental content system 130 to determine additional contextual information or changes in the viewer's environment 200. For example, this additional contextual information may indicate that there is now a can of soda pop 152 in the viewer's environment 200. Since the viewer went and got a can of soda pop after the advertisement of soda pop was presented to the viewer, the supplemental content can be identified as being effective.

It is also possible to track the use of the smart phones that are capturing the images of the viewers as components in the feedback loop to determine whether the expected result was achieved. For example, if a viewer's smart phone is providing images of one or more viewers during the program and immediately after an advertisement for an item, whether clothes, make-up, or truck tires is then used to search for this item on the internet, then this is a measure of the effectiveness of the advertisement. If the viewer takes the further step of using that smart phone to order or buy the item that was the subject matter of the advertisement, then this is another indicator of the effectiveness of the advertisement.

For one particular example, assume that there are four viewers of the program and each viewer has their smart phone active. During the program or advertisements being run during breaks in the program, one particular the viewer uses their smart phone to search for a product on the internet. This shows a first level of effectiveness of the advertisement. It also provides data showing which viewer produced that response. Then, one or more viewers many buy an item with their smart phone by placing the order within a selected time period, whether a few minutes, hours or days, after the content was shown. This shows a second level of effectiveness of the advertisement or other supplemental content. Since the content receiver 122 is in communication with the cell phone, and will continue to be for several hours or days if they are within wireless range of each other, it can obtain data providing an indication of which web sites were searched, which items were purchased and other activity by each viewer.

It should be recognized that the above described examples are for illustrative purposes and other types of content or supplemental content may be presented to the viewer, as well as other types of emotions or contextual information associated with the viewer or the viewer's environment may be detected.

The operation of certain aspects will now be described with respect to FIGS. 3-5. In at least one of various embodiments, processes 300, 400 and 500 described in conjunction with FIGS. 3-5, respectively, may be implemented by or executed on one or more computing devices, such as content distributor 102 and, in some embodiments, supplemental content system 130 executing on content distributor 102.

Figure 3:
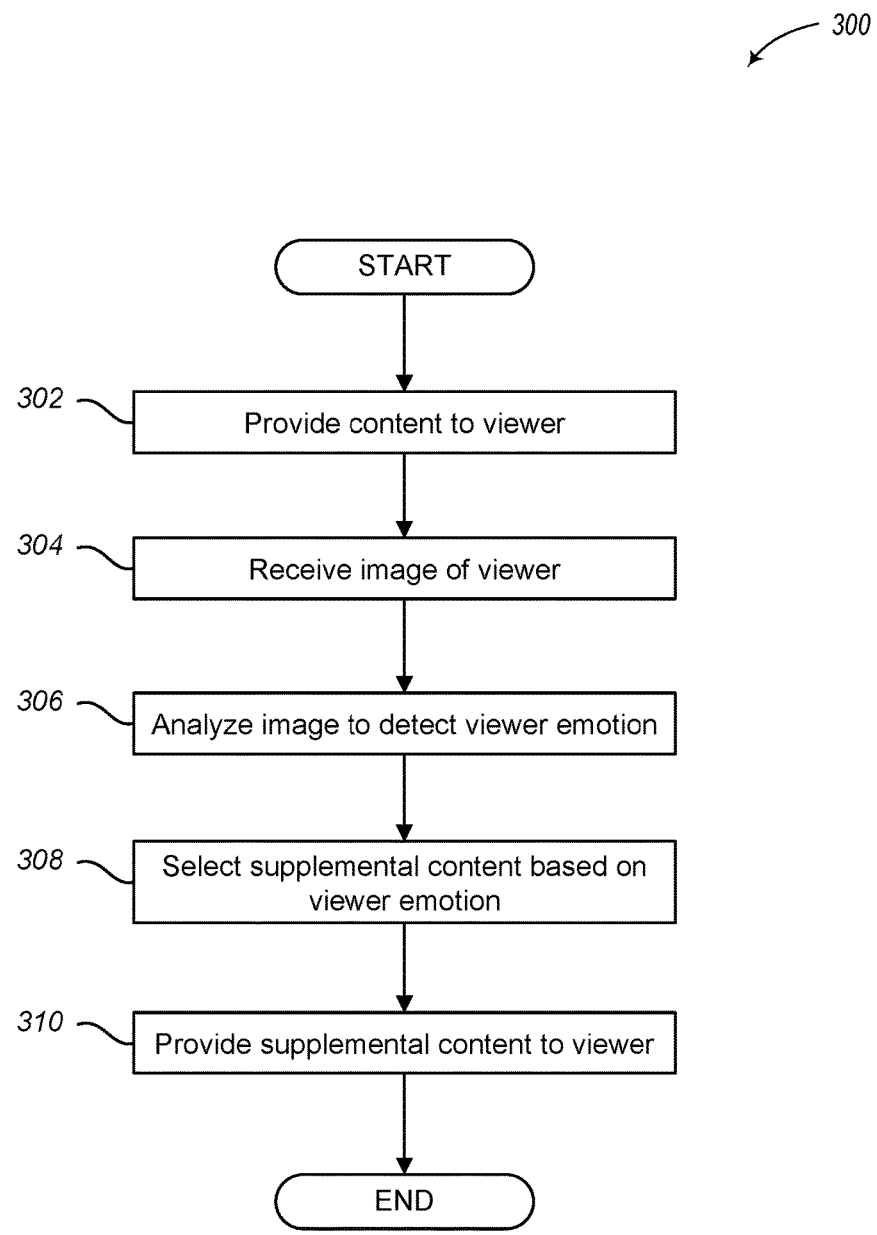
FIG. 3 illustrates a logical flow diagram showing one embodiment of an overview process for analyzing viewer emotion to select and provide supplemental content to a viewer in accordance with embodiments described herein.

FIG. 3 illustrates a logical flow diagram showing one embodiment of an overview process for analyzing viewer emotion to select and provide supplemental content to a viewer in accordance with embodiments described herein. Process 300 begins, after a start block, at block 302, where content is provided to a viewer. As discussed above, the content may be provided to a content receiver of the viewer for presentation or display on a display device of the viewer.

Process 300 proceeds to block 304, where one or more images of the viewer are received. In various embodiments, the images include the viewer's face, body, environment surrounding the viewer, or any combination thereof. The images may include a single image of the viewer, or it may include a plurality of image frames that together compose a video of the viewer.

Process 300 continues at block 306, where the one or more images are analyzed to detect a current emotion of the viewer. This analysis includes one or more facial or body recognition mechanisms that identify various different characteristics of the viewers face or body. The viewer emotion is identified based on the combination of these different characteristics. Examples, of these characteristics include, but are not limited to, mouth shape, position or movement of the cheeks, position or movement of the eyebrows, eyelid position, torso posture, hand placement, facial tone differences (e.g., blushing), etc.

In some embodiments, an emotion library or database may be maintained to include a collection of a plurality of different emotion examples and the corresponding combination of facial or body characteristics that are present in the example. In one embodiment, the one or more received images may be compared to the emotion examples in the emotion library to identify a particular emotion of the viewer based on the stored emotion example that most closely correlates with the viewer emotional reaction in the one or more images. In one example embodiment, the viewer emotions include anger, contempt, disgust, fear, happiness, neutral, sadness, and surprise. In some embodiments, the emotion library may include a plurality of different examples for each separate emotion. Emotion libraries of human responses and expressions are available in the prior art and well known. These libraries include many emotions at this time, including the eight just listed, as well as many others, including boredom, interest, curiosity, nervousness, excitement, and many others. Over time, the content of emotion libraries will expand beyond those available today and the teachings disclosed herein can be used to create and utilize emotions from any of those available in any library, whether now or in the future.

In some situations, there may be a group of a plurality of viewers viewing the content. In various embodiments, the images are analyzed to detect a current emotion of one or each separate viewer of the group of viewers. A collective emotion for the group to represent the detected emotion of the group is determined from the emotions of the separate viewers.

In some embodiments, the collective emotion is the emotion most common among the viewers in the group. In other embodiments, the collective emotion is the emotion of a particular viewer in the group, such as the viewer sitting closest the display device, the viewer sitting in front of the display device, a viewer identified as being the owner or primary user of the content receiver, a first identified viewer, or some other viewer having a predetermined characteristic. In yet other embodiments, the collective emotion may be determined based on a combination of the viewers' emotions.

For example, if one viewer is sad and another viewer is happy, then the collective emotion may be neutral. In some embodiments, each separate detected viewer emotion may be given a weight, such that, when combined and averaged, an aggregate emotion is determined. For example, assume the weights of the possible emotions are anger (weight of 1), contempt (weight of 2), disgust (weight of 3), fear (weight of 4), neutral (weight of 5), sadness (weight of 6), surprise (weight of 7), and happiness (weight of 8). For this example, assume one viewer is sad (weight of 7), two viewers are happy (each with a weight of 8, 16 total), and one viewer is angry (weight of 1). The total weight of the emotions is 24, with an average weight of 6. In this example, the aggregate or common emotion for the group of viewers is the emotion closest to the average weight, which in this example is sadness. It should be recognized that other weights and other methods for determining a collective emotion for a group of a plurality of viewers is envisaged.

Process 300 proceeds next to block 308, where supplemental content is selected based on the detected viewer emotion. In various embodiments, a database is maintained with a plurality of viewer emotion/supplemental content category relationships, as described in more detail above. Accordingly, in some embodiments, a supplemental-content category that corresponds to the detected viewer emotion is selected. Supplemental content having this selected supplemental-content category is then selected, such as from a plurality of available supplemental content.

Process 300 continues next at block 310, where the supplemental content is provided to the viewer. Similar to block 302, the supplemental content may be provided to the content receiver of the viewer for presentation or display on the display device of the viewer.

After block 310, process 300 terminates or otherwise returns to a calling process to perform other actions.

Figure 4:
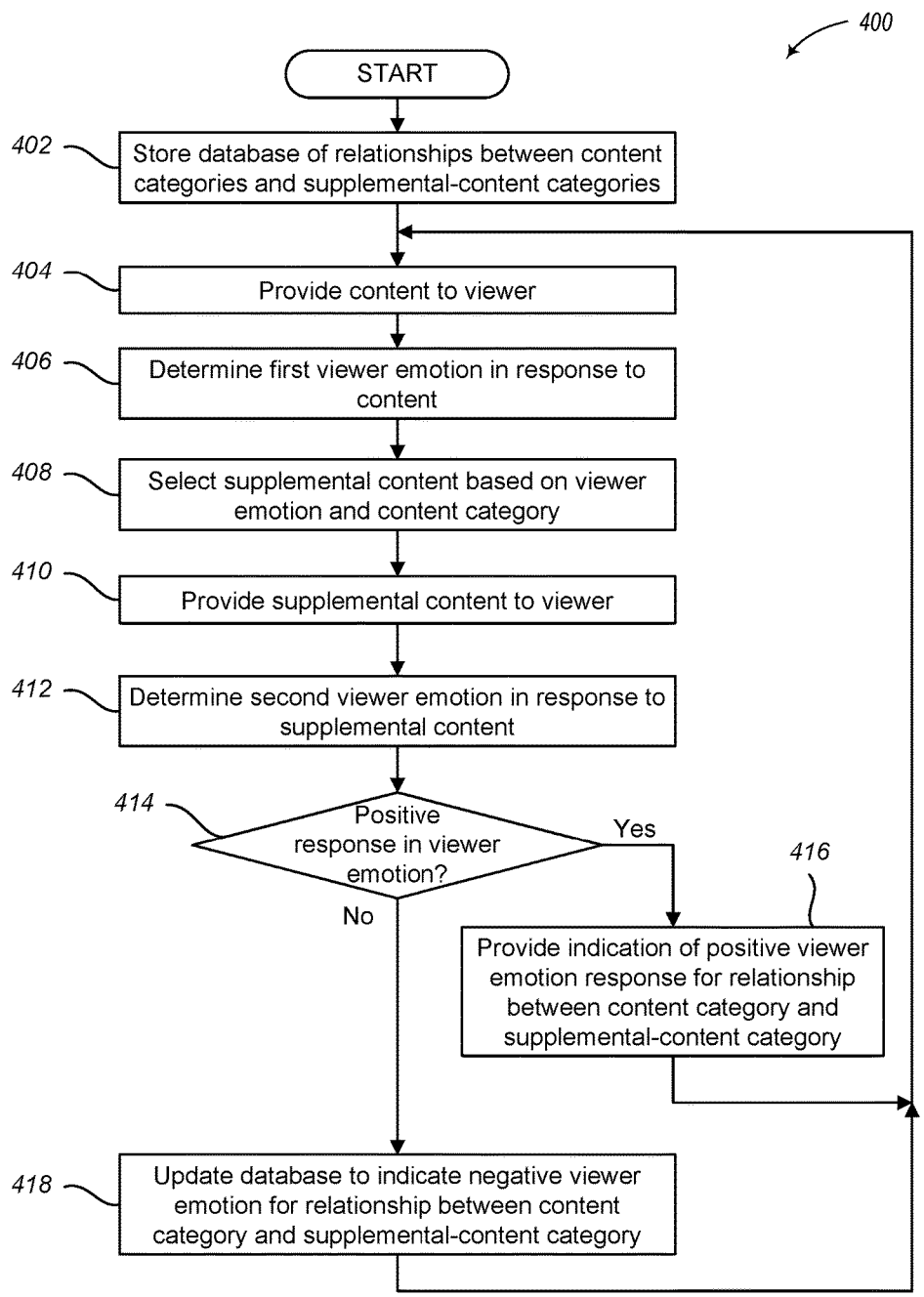
FIG. 4 illustrates a logical flow diagram showing an alternative embodiment of a process for analyzing viewer emotion to select and provide supplemental content to a viewer in accordance with embodiments described herein.

FIG. 4 illustrates a logical flow diagram showing an alternative embodiment of a process for analyzing viewer emotion to select and provide supplemental content to a viewer in accordance with embodiments described herein. Process 400 begins, after a start block, at block 402, where a database of relationships between content categories and supplemental-content categories is stored. As described above, the database maintains a plurality of relationships between content categories and supplemental-content categories, along with a corresponding viewer emotion. Each relationship identifies the supplemental-content category to select for a particular viewer emotion that the viewer is experiencing while viewing a particular content category. Again, the content and supplemental-content categories are descriptors of the particular content or content subject matter. In various embodiments, each relationship in the database also includes a corresponding expected emotional response from the viewer, which can be used to determine if the supplemental content was effective in provoking a particular emotion in the viewer.

Process 400 proceeds to block 404, where content having a content category is provided to a viewer. In various embodiments, block 404 is an embodiment of block 302 in FIG. 3. In some embodiments, the content category is provided with the content as metadata or it is determined separately using image recognition techniques, such as to identify the actors/actresses in the content, determine a genre of the content, etc.

Process 400 continues at block 406, where a first viewer emotion is determined in response to the viewer viewing the content. In various embodiments, block 406 employs embodiments of blocks 304 and 306 of FIG. 3 to capture and analyze a first set of images of the viewer while the viewer is viewing the content to determine or detect the first viewer emotion.

Process 400 proceeds next to block 408, where supplemental content is selected based on the detected first viewer emotion and the category of the content presented to the viewer. In various embodiments, the database stored at block 402 is accessed to select a supplemental-content category that corresponds to the detected first viewer emotion and the content category. Once the supplemental-content category is selected, supplemental content that includes the selected supplemental-content category is selected. In some embodiments, each of a plurality of available supplemental content having a corresponding supplemental-content category is analyzed to select supplemental content that has the selected supplemental-content category.

Process 400 continues next at block 410, where the supplemental content is provided to the viewer. In various embodiments, block 410 is an embodiment of block 310 in FIG. 3 to provide the supplemental content to the viewer.

Process 400 proceeds to block 412, where a second viewer emotion is determined in response to the viewer viewing the supplemental content. In various embodiments, block 412 employs embodiments of block 406 to capture and analyze a second set of images of the viewer while the viewer is viewing the supplemental content to determine or detect the second viewer emotion.

Process 400 continues at decision block 414, where a determination is made whether there is an expected response in the viewer emotion. As discussed above, the relationships stored in the database at block 402 may include a corresponding expected emotional response. In various embodiments, if the second viewer emotion matches the expected viewer response for the corresponding content category/supplemental-content category for the content and supplemental content presented to the viewer, then the second viewer emotion was an expected response. In other embodiments, the second viewer emotion is identified as being an expected response if the user performed a particular action during or after experiencing that emotion or during or after viewing the supplemental content, such as by purchasing an advertised product.

If there is an expected response in the viewer emotion, then process 400 flows to block 416; otherwise, process 400 flows to block 418. At block 416, an indication of the expected viewer response for the content/supplemental-content category relationship is provided to the supplemental content supplier or provider, or to some other third party. In some embodiments, the database stored at block 402 is updated to indicate the expected response for the viewer for the relationship between the content category presented to the viewer and the supplemental-content category presented to the viewer.

The database may also be updated to indicate the extent to which the expected emotional response was a positive response from the viewer. For example, the response might range from a first-level positive response that includes only a change of emotion (or expression of the expected emotion) in the viewer but no action by the viewer; to a second-level positive response that includes some action by the viewer, such as search of the internet for a particular item associated with the supplemental content; to a third-level positive response that is the purchase of a particular item associated with the supplemental content. Additional levels of positive response may also be utilized. For example, a fourth-level positive response might include two or more viewers of the supplemental content buying an item associated with the supplemental content or social media friends of the viewer looking at the same item associated with the supplemental content. Moreover, a fifth-level positive response might be an action by social media friends who did not see the supplemental content (e.g., buy the item associated with the supplemental content) but received a communication from the viewer who had a positive response (such the first-, second-, or third-level positive response mention above) to the supplemental content. Thus, the level of positive response might be from a first level that does not involve a current action but merely a change of emotion to second, third, fourth, fifth or higher level responses that include actions that range from searching, a study, a purchase, encouraging others to purchase and causing others to purchase. These positive response levels may be provided to the supplemental content provider or to a third party to be used to further determine the effectiveness of the supplemental content, all starting from the emotional state of the viewer.

After block 416, process 400 loops to block 404 to provide additional content to the viewer.

If, at decision block 414, there is a negative response in the viewer emotion, then process 400 flows from decision block 414 to block 418. At block 418, an indication of the negative viewer response for the content/supplemental-content category relationship is provided to the supplemental content supplier or provider, or to some other third party. In some embodiments, the database stored at block 402 is updated to indicate the negative response for the viewer for the relationship between the content category presented to the viewer and the supplemental-content category presented to the viewer. For example, in some embodiments, if a number of a plurality of viewers that have a negative response to the supplemental content is above a threshold number, then the database may be updated to indicate the negative response and to change the expected emotional response for that relationship.

Similar to what is described above, the database may be updated to indicate the extent to which the emotional response of the viewer was a negative response. For example, a first-level negative response is one that does not produce the expected emotion in the viewer. Such a response might be neutral, but since the planned response was not obtained, the result is a first-level negative response. A second-level negative response might be one that creates the opposite of the expected response, while a third-level negative response might be negative action by a viewer against the expected result (e.g., changing the channel, writing a poor review on an internet review website, or other negative action).

After block 418, process 400 loops to block 404 to provide additional content to the viewer.

Figure 5:
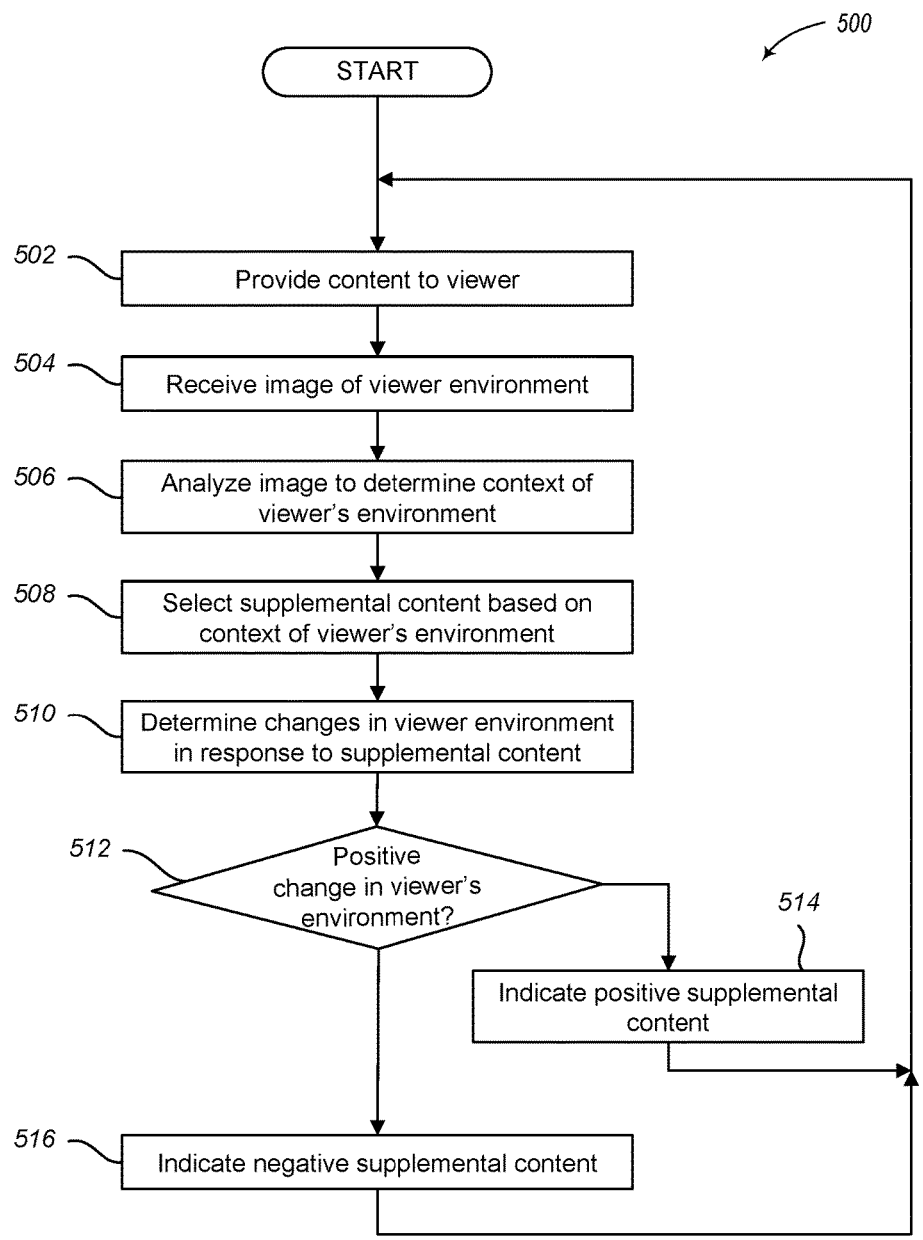
FIG. 5 illustrates a logical flow diagram showing one embodiment of a process for analyzing a viewer's environment to select and provide supplemental content to a viewer in accordance with embodiments described herein.

FIG. 5 illustrates a logical flow diagram showing one embodiment of a process for analyzing a viewer's environment to select and provide supplemental content to a viewer in accordance with embodiments described herein. Process 500 begins, after a start block, at block 502, where content is provided to a viewer. In various embodiments, block 502 is an embodiment of block 302 in FIG. 3.

Process 500 proceeds to block 504, where an image of the viewer's environment is received. In various embodiments, the image is a single image or a plurality of image frames that together compose a video of the viewer's environment. The viewer's environment is the area surrounding the viewer. For example, if the viewer is sitting in their living room, the viewer's environment would be the viewable portion in the image of the living room and everything therein. In general the viewer's environment is any viewable portion of the image that does not include the viewer.

Process 500 continues at block 506, where the image is analyzed to determine contextual information regarding the viewer's environment. The contextual information is any information that defines or identifies what is in the viewer's environment. For example, the contextual information may indicate that the environment is the viewer's living room and includes a can of Brand_X soda pop, a bag of Brand_A chips, a couch, a mobile phone, etc. In various embodiments, the analysis of the image is performed using one or more image recognition techniques that identify objects in the image. In some embodiments, a database of known objects may be maintained and used in conjunction with the image recognition to determine contextual information regarding the environment. In at least one such embodiment, the known objects are objects that are related to or somehow associated with available supplemental content that can be presented to the viewer.

Process 500 proceeds next to block 508, where supplemental content is selected based on the context of the viewer's environment. For example, if the analysis of the image at block 506 indicates that there is a can of Brand_X soda pop in the viewer's environment, then supplemental content that advertises Brand_M cookies, where Brand_M cookies and Brand_X soda pop are owned by the same company, is presented. The relationship between contextual information identifiable in a viewer's environment and the supplemental content may be defined by the supplier of the supplemental content, which in some embodiments may be stored in the metadata of the supplemental content. In various embodiments, the system may store a database of these relationships to be used in selecting the supplemental content based on the context of the viewer's environment.

Process 500 continues next at block 510, where changes in the viewer's environment are determined in response to the supplemental content. In various embodiments, block 510 employs embodiments of block 504 and 506 to receive and analyze additional images of the viewer's environment during or after the supplemental content is provided to the viewer.

Process 500 proceeds to decision block 512, where a determination is made whether there is an expected response in the viewer's environment. In various embodiments, this determination is made based on what changed in the viewer's environment. For example, the contextual information at block 506 indicated that there was a can of Brand_X soda pop, and the supplemental content presented to the viewer was an advertisement for Brand_X soda pop, did the viewer take a drink from the can, which may indicate that the advertisement enticed the viewer into drinking Brand_X soda pop, and is, thus, an expected response. In various embodiments, an administrator or an average change among a plurality of viewers may be used as the basis for determining if the change in the environment is an expected response.

If there was an expected change in the viewer's environment, process 500 flows to block 514, otherwise, process 500 flows to block 516. At block 514, an indication of an expected supplemental content is provided to the supplemental content supplier or some other third party that is interested in how positive or effective the supplemental content was. After block 516, process 500 loops to block 502 to provide additional content to the viewer.

If, at decision block 512, there was a negative change in the viewer's environment, such as if the viewer left the environment or performed some other action that was not identifiable as being positively influenced by the supplemental content, then process 500 flows from decision block 512 to block 516. At block 516, an indication of negative supplemental content is provided to the supplemental content supplier or some other third party that is interested in how positive or effective the supplemental content was. After block 518, process 500 loops to block 502 to provide additional content to the viewer.

Although FIG. 5 does not directly discuss also using the viewer's emotion to select supplemental content, as discussed elsewhere herein, such as in conjunction with FIGS. 3 and 4, embodiments are not so limited. Rather, in some embodiments, process 500 in FIG. 5 may be combined with process 300 in FIG. 3 or process 400 in FIG. 4 to select supplemental content based on a combination of the viewer emotion and the viewer environment.

Figure 6:
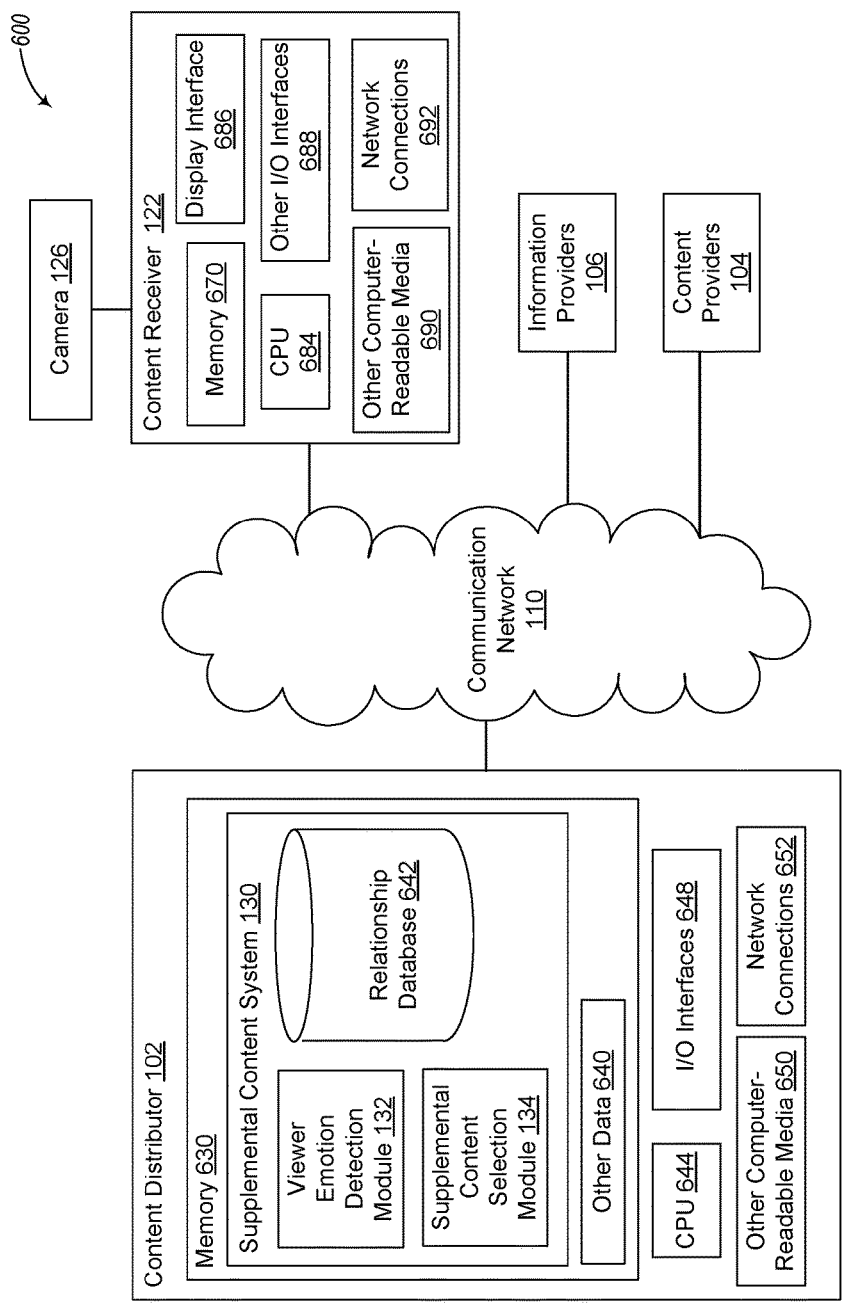
FIG. 6 shows a system diagram that describes one implementation of computing systems for implementing embodiments described herein.

FIG. 6 shows a system diagram that describes one implementation of computing systems for implementing embodiments described herein. System 600 includes content distributor 102, content receiver 122, content provider 104, and information provider 106.

Content distributor 102 provides content to content receiver 122 for presentation to a viewer. In general, the content distributor 102 analyzes images of the viewer to detect an emotion of the viewer in response to viewing content and selects supplemental content based on the detected viewer emotion. One or more special-purpose computing systems may be used to implement content distributor 102. Accordingly, various embodiments described herein may be implemented in software, hardware, firmware, or in some combination thereof. Content distributor 102 may include memory 630, one or more central processing units (CPUs) 644, I/O interfaces 648, other computer-readable media 650, and network connections 652.

Memory 630 may include one or more various types of non-volatile and/or volatile storage technologies. Examples of memory 630 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 630 may be utilized to store information, including computer-readable instructions that are utilized by CPU 644 to perform actions, including embodiments described herein.

Memory 630 may have stored thereon supplemental content system 130, which includes viewer emotion detection module 132 and supplemental content selection module 134. The viewer emotion detection module 132 may employ embodiments described herein to analyze images of the viewer or the viewer's environment to detect the viewer's emotions or contextual information related to the viewer's environment. The supplemental content selection module 134 may employ embodiments described herein to utilize the detected viewer emotion to selected supplemental content to provide to the viewer of the content receiver 122. Although viewer emotion detection module 132 and supplemental content selection module 134 are shown as separate modules, embodiments are not so limited. Rather, a single module or a plurality of additional modules may be utilized to perform the functionality of viewer emotion detection module 132 and supplemental content selection module 134.

The supplemental content system 130 also includes a relationship database 642 that stores one or more relationships that are utilized by the supplemental content selection module 134 to select supplemental content based on the detected viewer emotion. In some embodiments, the relationship database 642 stores a plurality of relationships between viewer emotions and supplemental content. In other embodiments, the relationship database 642 stores a plurality of relationships between content categories, supplemental-content categories, and their corresponding viewer emotion. Memory 630 may also store other data 640, which may include a plurality of supplemental content, viewer preferences, viewer emotion histories, or other data.

Network connections 652 are configured to communicate with other computing devices, such as content receiver 122, information providers 106, and content providers 104, via communication network 110. Other I/O interfaces 648 may include a keyboard, audio interfaces, video interfaces, or the like. Other computer-readable media 650 may include other types of stationary or removable computer-readable media, such as removable flash drives, external hard drives, or the like.

Content receiver 122 receives content and supplemental content from content distributor 102. One or more special-purpose computing systems may be used to implement content receiver 122. Accordingly, various embodiments described herein may be implemented in software, hardware, firmware, or in some combination thereof. Content receiver 122 may include memory 670, one or more central processing units (CPUs) 684, display interface 686, other I/O interfaces 688, other computer-readable media 690, and network connections 692.

Memory 670 may include one or more various types of non-volatile and/or volatile storage technologies, similar to what is described above for memory 630. Memory 670 may be utilized to store information, including computer-readable instructions that are utilized by CPU 684 to perform actions. In some embodiments, memory 670 includes viewer emotion detection module 132, or portions thereof, to perform at least some of the functionality related to analyzing images of the viewer to detect the viewer's emotion. In this way, the content receiver 122 can provide the viewer emotion to the content distributor without sending the images of the viewer.

Display interface 686 is configured to provide content to a display device, such as display device 124 in FIG. 1, for presentation of the content and the supplemental content to a viewer. Other I/O interfaces 688 may include a keyboard, audio interfaces, other video interfaces, or the like. In various embodiments, other I/O interfaces 688 communicate with camera 126 to capture images of the viewer or the viewer's environment. The content receiver 122 then provides the images to content distributor 102. Network connections 692 are configured to communicate with other computing devices, such as content distributor 102, via communication network 110. Other computer-readable media 690 may include other types of stationary or removable computer-readable media, such as removable flash drives, external hard drives, or the like.

In some embodiments, information providers 106 and the content providers 104 include one or more server computer devices to provide content, supplemental content, or other information to the content distributor 102. These server computer devices include processors, memory, network connections, and other computing components that enable the server computer devices to perform actions.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   one or more cameras;
   a database storing relationships between content categories and supplemental-content categories, and corresponding emotional responses;
   one or more processors; and
   a memory device storing computer instructions that, when executed by the one or more processors, cause the one or more processors to:
   provide content having a content category to a content receiver for presentation to a viewer;
   receive at least one first image of the viewer taken by the one or more cameras while the content is being presented to the viewer;
   analyze the at least one first image to detect a first viewer emotion in reaction to the content currently being presented to the viewer;
   select supplemental content having a supplemental-content category to provide to the viewer based on the detected first viewer emotion and the content category;
   provide the supplemental content to the content receiver for presentation to the viewer;
   receive at least one second image of the viewer taken by the one or more cameras while the supplemental content is being presented to the viewer;
   analyze the at least one second image to detect a second viewer emotion in reaction to the supplemental content currently being presented to the viewer;
   determine an emotional response of the viewer based on the detected first viewer emotion and the detected second viewer emotion; and
   update a relationship between the content category and the supplemental-content category in the database based the determined emotional response of the viewer.

2. The system of claim 1, wherein the determination of the emotional response includes:
   detecting if a change between the detected first viewer emotion and the detected second viewer emotion is an expected emotional response; and
   updating the relationship between the content category and the supplemental-content category to indicate the positive emotional response of the viewer.

3. The system of claim 1, wherein the determination of the emotional response includes:
   detecting if a change between the detected first viewer emotion and the detected second viewer emotion is a negative emotional response; and
   updating the relationship between the content category and the supplemental-content category to indicate the negative emotional response of the viewer.

4. The system of claim 1, wherein the memory device stores further computer instructions that, when executed by the one or more processors, cause the one or more processors to:
   analyze the at least one first image for first contextual information regarding an environment surrounding the viewer while the content is being presented to the viewer;
   analyze the at least one second image for second contextual information regarding the environment surrounding the viewer while the supplemental content is being presented to the viewer;
   detect one or more changes in the environment based on a comparison between the first and second contextual information; and
   update the relationship between the content category and the supplemental-content category in the database based the one or more detected changes in the environment.

5. The system of claim 4, wherein the detection of the one or more changes includes identifying a product in the at least one second image that was not in the at least one first image and is related to the supplemental content.

6. The system of claim 1, wherein the content category indicates a current emotion of the content and the supplemental-content category indicate current emotion of the supplemental content.

7. The system of claim 1, wherein the memory device stores further computer instructions that, when executed by the one or more processors, cause the one or more processors to:
- analyze the at least one first image to detect contextual information regarding an environment surrounding the viewer while the content is being presented to the viewer; and
- select the supplemental content based on the contextual information of the environment.

8. The system of claim 7, wherein the memory device stores further computer instructions that, when executed by the one or more processors, cause the one or more processors to:
- analyze the at least one second image for second contextual information regarding the environment surrounding the viewer while the supplemental content is being presented to the viewer;
- detect one or more changes in the environment based on a comparison between the first and second contextual information; and
- update the relationship between the content category and the supplemental-content category in the database based the one or more detected changes in the environment.

9. The system of claim 1, wherein the content is a television program and the supplemental content is an advertisement.

10. A computing device, comprising:
- a memory device that stores relationships between content categories and supplemental-content categories, and corresponding emotional responses, and that stores computer instructions;
- one or more processors that execute the computer instructions to perform actions, the actions including:
  - providing content having a content category to a content receiver for presentation to a viewer;
  - analyzing at least one first image of an environment surrounding the viewer taken while the content is being presented to the viewer to identify first contextual information associated with the environment;
  - selecting supplemental content having a supplemental-content category to provide to the viewer based on the first contextual information;
  - providing the supplemental content to the content receiver for presentation to the viewer;
  - analyzing at least one second image of the environment taken while the supplemental content is being presented to the viewer to identify second contextual information associated with the environment;
  - determining an emotional response of the viewer based on changes between the first contextual information and the second contextual information; and
  - updating a relationship between the content category and the supplemental-content category in a database based the determined emotional response of the viewer.

11. The computing device of claim 10, wherein the determining of the emotional response includes:
- comparing the first contextual information with the second contextual information to identify a product in the at least one second image that was not in the at least one first image; and
- updating the relationship between the content category and the supplemental-content category in the database to indicate an expected emotional response of the viewer.

12. The computing device of claim 11, wherein the updating of the relationship between the content category and the supplemental-content category includes:
- determining if the product is associated with the supplemental content; and
- in response to the product being associated with the supplemental content, updating the relationship between the content category and the supplemental-content category in the database to indicate an expected emotional response of the viewer.

13. The computing device of claim 10, wherein the determining of the emotional response includes:
- comparing the first contextual information with the second contextual information to identify movement of a product within the environment; and
- updating the relationship between the content category and the supplemental-content category in the database to indicate an expected emotional response of the viewer.

14. The computing device of claim 13, wherein the updating of the relationship between the content category and the supplemental-content category includes:
- determining if the product is associated with the supplemental content; and
- in response to the product being associated with the supplemental content, updating the relationship between the content category and the supplemental-content category in the database to indicate an expected emotional response of the viewer.

15. The computing device of claim 10, wherein the determining of the emotional response of the viewer, further includes:
- analyzing the at least one first image to detect a first viewer emotion in reaction to the content currently being presented to the viewer;
- analyzing the at least one second image to detect a second viewer emotion in reaction to the supplemental content currently being presented to the viewer; and
- determining the emotional response of the viewer based on the detected first viewer emotion and the detected second viewer emotion.

16. The computing device of claim 15, wherein the determining of the emotional response of the viewer, further includes:
- detecting if a change between the detected first viewer emotion and the detected second viewer emotion is an expected emotional response; and
- updating the relationship between the content category and the supplemental-content category to indicate the positive emotional response of the viewer.

17. The computing device of claim 15, wherein the determining of the emotional response of the viewer, further includes:
- detecting if a change between the detected first viewer emotion and the detected second viewer emotion is a negative emotional response; and
- updating the relationship between the content category and the supplemental-content category to indicate the negative emotional response of the viewer.

18. A method executing on a content distribution server, comprising:
- providing content to a content receiver for presentation to a user;
- receiving at least one image of the user while the content is being presented to the user;

analyzing the at least one image to detect an emotion of the user in reaction to the content currently being presented to the user;

selecting at least one supplemental content to provide to the user in response to the detected user emotion;

providing the at least one supplemental content to the content receiver for presentation to the user; and determining an emotional response of the user in reaction to the at least one supplemental content being presented to the user based on a change from the detected user emotion to a second detected emotion of the user.

19. The method of claim 18, further comprising:

analyzing the at least one image to identify contextual information associated with an environment surrounding the user; and selecting the at least one supplemental content based on the contextual information.

20. The method of claim 18, wherein the determining of the emotional response of the user includes:

receiving at least one second image of the user while the supplemental content is being presented to the user;

analyzing the at least one second image to detect the second emotion of the user in reaction to the supplemental content currently being presented to the user;

determining the emotional response of the user based on changes from the emotion of the user in reaction to the content to the second emotion of the user in reaction to the supplemental content; and providing the emotional response to a supplier of the supplemental content.

* * * * *